US011532809B2

(12) United States Patent
Slezak

(10) Patent No.: US 11,532,809 B2
(45) Date of Patent: Dec. 20, 2022

(54) CARBON COATING OF ALKALINE CATHODE MATERIALS

(71) Applicant: Energizer Brands, LLC, St. Louis, MO (US)

(72) Inventor: Philip J. Slezak, North Ridgeville, OH (US)

(73) Assignee: Energizer Brands, LLC, St. Louis, MO (US)

( * ) Notice: Subject to any disclaimer, the term of this patent is extended or adjusted under 35 U.S.C. 154(b) by 218 days.

(21) Appl. No.: 16/718,544

(22) Filed: Dec. 18, 2019

(65) Prior Publication Data

US 2020/0203713 A1 Jun. 25, 2020

Related U.S. Application Data

(60) Provisional application No. 62/781,961, filed on Dec. 19, 2018.

(51) Int. Cl.
*H01M 4/1393* (2010.01)
*H01M 4/66* (2006.01)
*H01M 4/1395* (2010.01)
*H01M 4/62* (2006.01)
*H01M 4/525* (2010.01)
*H01M 4/04* (2006.01)
*H01M 4/505* (2010.01)
*H01M 4/02* (2006.01)

(52) U.S. Cl.
CPC ....... *H01M 4/1393* (2013.01); *H01M 4/0428* (2013.01); *H01M 4/1395* (2013.01); *H01M 4/505* (2013.01); *H01M 4/525* (2013.01); *H01M 4/623* (2013.01); *H01M 4/663* (2013.01); *H01M 2004/021* (2013.01)

(58) Field of Classification Search
CPC ............. H01M 4/1393; H01M 4/0428; H01M 4/1395; H01M 4/505; H01M 4/525; H01M 4/623; H01M 4/663; H01M 2004/021; H01M 4/48; H01M 4/52; H01M 4/622; H01M 4/625; Y02E 60/10
See application file for complete search history.

(56) References Cited

U.S. PATENT DOCUMENTS

2017/0301960 A1* 10/2017 Menard .................. H01M 4/42
2019/0296342 A1*  9/2019 Harada .................. C01G 33/00

OTHER PUBLICATIONS

Fang et al., "Temperature- and thickness-dependent electrical conductivity of few-layer graphene and graphene nanosheets," Phys. Letters A., 379(37):2245-2251, (2015).
Ponrouch et al., "A new room temperature and solvent free carbon coating procedure for battery electrode materials," Energy Environ. Sci., 6:3363-3371, (2013).

* cited by examiner

*Primary Examiner* — Andrew J. Oyer
(74) *Attorney, Agent, or Firm* — Alston & Bird LLP

(57) ABSTRACT

Cathodes are provided, wherein at least one of the cathode's active material, binder, or graphite are in the form of carbon-coated particles. Alternatively, rings of the cathode, or the cathode itself, may be coated with carbon. The coating may be as thin as a single layer of carbon. Electrochemical cells comprising such cathodes are also provided. Methods of preparing such cathodes and electrochemical cells are also provided.

18 Claims, 2 Drawing Sheets

CARBON COATING OF ALKALINE CATHODE MATERIALS

CROSS-REFERENCE TO RELATED APPLICATIONS

This application claims the benefit of U.S. Provisional Application Ser. No. 62/781,961, filed Dec. 19, 2018, the contents of which are hereby incorporated by reference in their entirety.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

Manganese dioxide ($MnO_2$) is a well-known substance commonly used in electrochemical cells, such as dry cell batteries, as an active cathode material, often in the form of electrolytic manganese dioxide (EMD). Conductive carbon, such as graphite, can be added to the cathode in order to increase the conductivity of the cathode. This can increase performance of the cathode, particularly in high drain applications. However, because replacing EMD with carbon reduces the amount of EMD, the overall capacity of the battery is reduced. Thus, it is desirable to produce an EMD/carbon electrode with less carbon (i.e. a higher oxide-to-carbon ratio, or O:C), so as to obtain the benefit of the carbon's conductivity while making a minimal tradeoff in capacity.

It was in an effort to overcome the limitations of the above-described cells, and other such cells, that the present embodiments were designed.

BRIEF SUMMARY

An embodiment is an electrode for an electrochemical cell, said electrode comprising electrode components, said electrode components comprising i) an active material, wherein the active material is an oxide, ii) a binder, and iii) graphite, wherein at least one of the electrode components is in the form of particles comprising a carbon coating.

An embodiment is an electrode for an electrochemical cell, wherein the electrode is a ring-molded electrode comprising a plurality of rings, and wherein at least one of the rings has a carbon coating. Another embodiment is an electrode for an electrochemical cell, said electrode having a carbon coating, wherein the carbon coating has a thickness of about 0.3 nm-3 nm, or about 0.3 nm-2 nm, or about 0.3 nm-1 nm, or about 0.3 nm-0.8 nm.

An embodiment is an alkaline electrochemical cell comprising any of the above electrodes.

An embodiment is a method of producing any of said electrodes, comprising
i) mixing active material, binder, and graphite, wherein at least one of these is in the form of particles having a carbon coating, with electrolyte and, optionally, additives, so as to make an electrode mix; and
ii) forming a plurality of rings from the electrode mix; and
iii) inserting the rings into a container.

An embodiment is a method of producing any of said electrodes, comprising
i) mixing active material, binder, and graphite, wherein at least one of these is in the form of particles having a carbon coating, with electrolyte and, optionally, additives, so as to make an electrode mix; and
ii) using a ram to mold the electrode mix into a solid tubular configuration.

DETAILED DESCRIPTION

Figure 1:
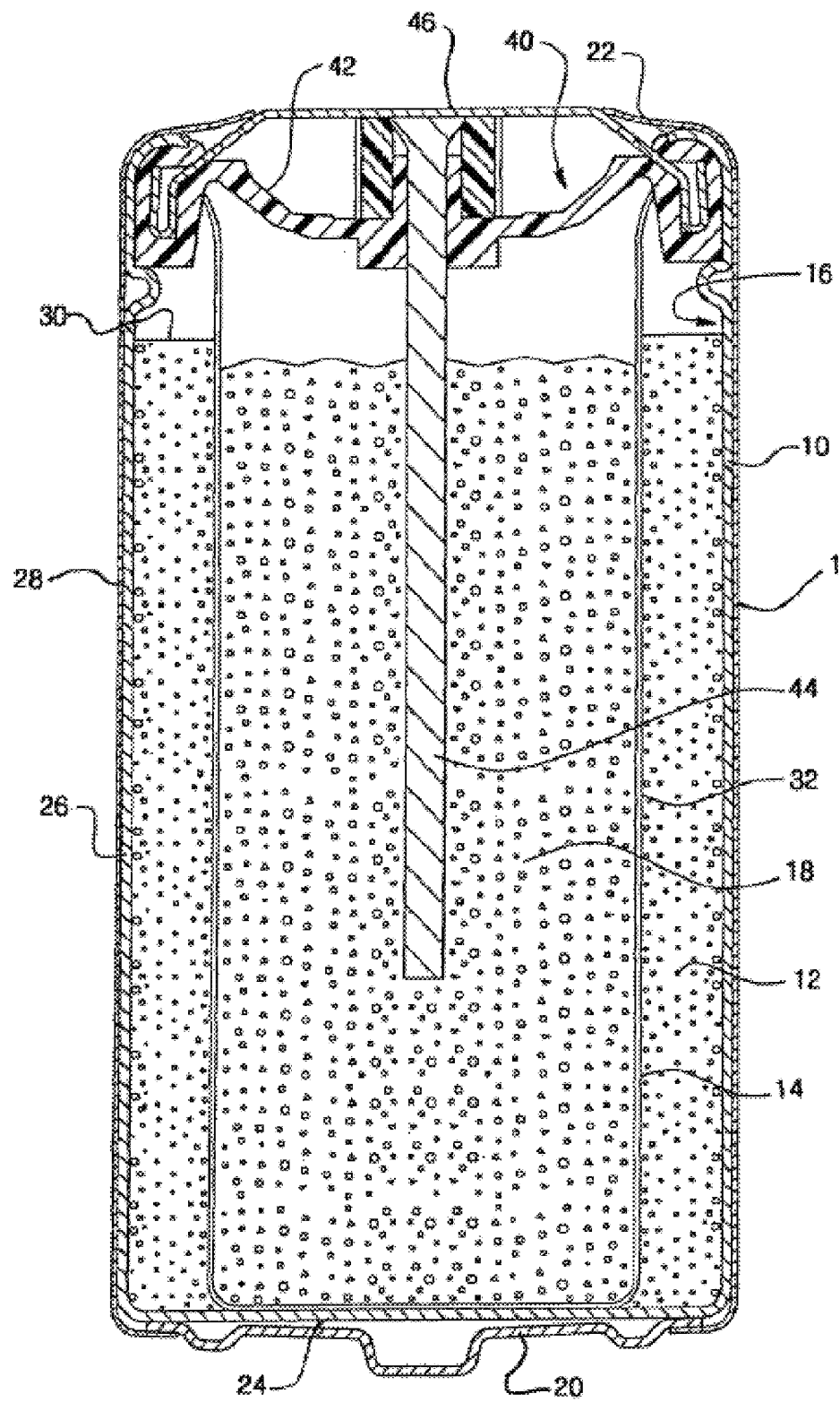
FIG. 1 is a cross-sectional elevational view of an alkaline electrochemical cell of an embodiment.

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

As used herein, "about" in the context of a numerical value or range means within ±10% of the numerical value or range recited or claimed.

As used herein, a "carbon coating" refers to at least one layer of conductive carbon coating a component of an electrochemical cell. The layer may be of any thickness, including as thin as a single molecule layer, such as graphene.

As used herein, "improvement" with respect to conductivity means that the conductivity is increased. Generally, an "improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, easier or faster to manufacture, etc.).

As used herein, "oxide" refers to a chemical compound that contains at least one oxygen atom and one other element. One class of oxides is metal oxides.

As used herein, a "primary" electrochemical cell is a non-rechargeable (i.e. disposable) electrochemical cell. A "secondary" electrochemical cell is a rechargeable electrochemical cell.

As used herein, "conductivity" refers to a given material's ability to conduct electric current. This is typically measured in Siemens per meter (S/m).

An embodiment is an electrode for an electrochemical cell, said electrode comprising electrode components, said electrode components comprising i) an active material, wherein the active material is an oxide, ii) a binder, and iii) graphite, wherein at least one of the electrode components is in the form of particles comprising a carbon coating. In an embodiment, the active material is in the form of particles comprising a carbon coating. In an embodiment, the binder is in the form of particles comprising a carbon coating. In an embodiment, the graphite is in the form of particles comprising a carbon coating.

In an embodiment, the active material comprises manganese dioxide, a nickelate, nickel oxyhydroxide, or copper oxide. In a further embodiment, the manganese dioxide is electrolytic manganese dioxide (EMD), chemical manganese dioxide (CMD), or natural manganese dioxide (NMD).

In an embodiment, the graphite is expanded graphite.

In an embodiment, the binder comprises a material selected from the group consisting of polyvinylidene fluoride (PVDF), polyethylene, copolymers based on polystyrene and ethylene/propylene, such as those available under the Kraton® trade name, sold by Kraton Corporation (Houston, Tex.), polytetrafluoroethene (PTFE), poly(3,4-ethylenedioxythiophene) (PEDOT) copolymers, polystyrene sulfonate (PSS), and PEDOT:PSS polymer mixtures.

An embodiment is an electrode for an electrochemical cell, wherein the electrode is a ring-molded electrode comprising a plurality of rings, and wherein at least one of the rings has a carbon coating. Another embodiment is an electrode for an electrochemical cell, said electrode having a carbon coating, wherein the carbon coating has a thickness of about 0.3 nm-3 nm, or about 0.3 nm-2 nm, or about 0.3 nm-1 nm, or about 0.3 nm-0.8 nm.

In an embodiment, the carbon coating has a thickness of about 0.3 nm-3 nm, or about 0.3 nm-2 nm, or about 0.3 nm-1 nm, or about 0.3 nm-0.8 nm. In an embodiment, the carbon coating is one layer of carbon thick.

In an embodiment, the electrode's conductivity is greater than that of an otherwise identical electrode which does not comprise the carbon coating. In an embodiment, the conductivity is from 1% more to 90% more, or from 5% more to 80% more, or from 10% more to 70% more, or from 15% more to 60% more, or from 20% more to 50% more, or from 25% more to 40% more, or from 30% more to 35% more.

An embodiment is an alkaline electrochemical cell comprising any of the above electrodes. In an embodiment, the electrochemical cell is a primary cell. In an embodiment, the electrochemical cell is a primary cell. In an embodiment, the electrochemical cell comprises an anode having an active material selected from the group consisting of zinc, magnesium, aluminum and silicon. In an embodiment, the electrochemical cell comprises an electrolyte solution which comprises potassium hydroxide (KOH), sodium hydroxide (NaOH), lithium hydroxide (LiOH), magnesium hydroxide ($Mg(OH)_2$), calcium hydroxide ($Ca(OH)_2$), magnesium perchlorate ($Mg(ClO_4)_2$), magnesium chloride ($MgCl_2$), or magnesium bromide ($MgBr_2$). In an embodiment, the electrochemical cell has a voltage that is 0.1 V-2.0 V, 0.2 V-1.9 V, 0.3 V-1.8 V, 0.4 V-1.7 V, 0.5 V-1.6 V, 0.6 V-1.5 V, 0.7 V-1.4 V, 0.8 V-1.3 V, 0.9 V-1.2 V, 1.0 V-1.1 V, or is 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, or 2.0 V.

An embodiment is a method of producing any of said electrodes, comprising
i) mixing active material, binder, and graphite, wherein at least one of these is in the form of particles having a carbon coating, with electrolyte and, optionally, additives, so as to make an electrode mix; and
ii) forming a plurality of rings from the electrode mix; and
iii) inserting the rings into a container.

An embodiment is a method of producing any of said electrodes, comprising
i) mixing active material, binder, and graphite, wherein at least one of these is in the form of particles having a carbon coating, with electrolyte and, optionally, additives, so as to make an electrode mix; and
ii) using a ram to mold the electrode mix into a solid tubular configuration.

In a further embodiment, the electrode is a cathode.

In a further embodiment, the particles having a carbon coating are prepared by a method selected from the group consisting of chemical vapor deposition, carbon evaporation, laser ablation, and arc discharge.

The embodiments will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and other electrode configurations, as known in the art. The materials and designs for the components of the electrochemical cell illustrated in FIG. 1 are for the purposes of illustration, and other materials and designs may be substituted. Moreover, in certain embodiments, the cathode and anode materials may be coated onto a surface of a separator and/or current collector and rolled to form a "jelly roll" configuration.

In FIG. 1, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is an example main active material for the negative electrode of the embodiments. Mercury and magnesium may also be used. Preferably, the volume of active material utilized in the negative electrode is sufficient to maintain a desired particle-to-particle contact and a desired anode to cathode (A:C) ratio.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

The aqueous alkaline electrolyte comprises an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 150° C.; and a particle size D50 (median diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

Second electrode 12, also referred to herein as the positive electrode or cathode, may include manganese dioxide ($MnO_2$) as the electrochemically active material. The $MnO_2$ is often in the form of electrolytic manganese dioxide (EMD). EMD is present in an amount generally from about 80 to about 98 weight percent and preferably from about 81 to 97 weight percent based on the total weight of the positive electrode, i.e., manganese dioxide, binder, graphite, positive electrode electrolyte, and additives, if present. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed (known as impact molding). Second electrode 12 has a ledge 30 and an interior surface 32 as illustrated in FIG. 1. Alternatively, the positive electrode may be formed by pre-forming a plurality of rings from the mixture comprising EMD, and then inserting the rings into the container to form the tubular-shaped second electrode (known as ring molding). The cell shown in FIG. 1 would typically include 3 or 4 rings.

The active material may be in the form of particles having any size suitable for use in an electrode mixture. In an embodiment, the active material is in the form of particles having an average size of approximately 40 microns. In an embodiment, the active material is in the form of particles having a size ranging from 0.1 microns to 400 microns.

The cathode also comprises a binder, which may be any binder known in the art. Non-limiting examples of binders include polyvinylidene fluoride (PVDF), polyethylene, copolymers based on polystyrene and ethylene/propylene, such as those available under the Kraton® trade name, sold by Kraton Corporation (Houston, Tex.), polytetrafluoroethene (PTFE), poly(3,4-ethylenedioxythiophene) (PEDOT) copolymers, polystyrene sulfonate (PSS), and PEDOT:PSS polymer mixtures.

The binder may be in the form of particles having any size suitable for use in an electrode mixture. In an embodiment, the binder is in the form of particles having an average size ranging from 12-22 microns. In an embodiment, the maximum size of the binder particles is 75 microns.

The cathode also comprises graphite. The graphite may be expanded graphite.

The graphite may be in the form of particles having any size suitable for use in an electrode mixture. In an embodiment, the binder is in the form of particles having an average size ranging from nanoparticle-sized to 65 microns. In an embodiment, the maximum size of the graphite particles is 110 microns.

The listed particle sizes may refer to sizes of coated or uncoated particles.

Particles of the active material, binder, or graphite may be carbon-coated. Additionally, the electrode itself, or rings which make up the electrode, may be carbon-coated. The carbon-coating may be performed by any method known in the art. Such methods include chemical vapor deposition, or CVD (such as cold wall CVD and hot wall CVD), carbon evaporation, laser ablation, and arc discharge.

An example of an additional cathode additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as Coathylene® (Axalta Coating Systems, Glen Mills, Pa.), and calcium stearate.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be greater than 1.32:1, such as greater than 1.34:1, and specifically 1.36:1 for impact molded positive electrodes. The A:C ratio for ring molded positive electrodes can be lower, such as about 1.2:1 to about 1.1:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

DISCUSSION AND EXAMPLES

As noted above, conductive carbon may be introduced into electrodes to improve conductivity. The invention of single wall carbon nanotubes (SWCNTs), graphene, and expanded graphite improved the conductivity of carbon significantly. Previous work has included mixing SWCNTs and other highly conductive carbons into electrode mixes. It was found that EMD/carbon mixtures of up to at least a 60:1 O:C ratio could be used with the incorporation of SWCNTs.

Improved conductivity with very thin carbons can be can be achieved by depositing carbon directly on the EMD, binder, carbon, or cathode/rings, leading to improved conductivity. With carbon directly deposited on these surfaces, it is expected that contact with cathode materials and conductivity is improved over the conventional process. Moreover, since the material is directly placed at the surface, it is expected that excess carbon that naturally occurs when physical mixtures are used can be reduced. This can lead to less carbon blocking the pores within the cathode, resulting in improved soak up and diffusion of electrolyte within the cathode. This can lead to an additional reduction of carbon used in the electrode, resulting in improved utilization beyond what may be achievable with electrodes comprising carbon mixtures.

Figures 2A, 2B:
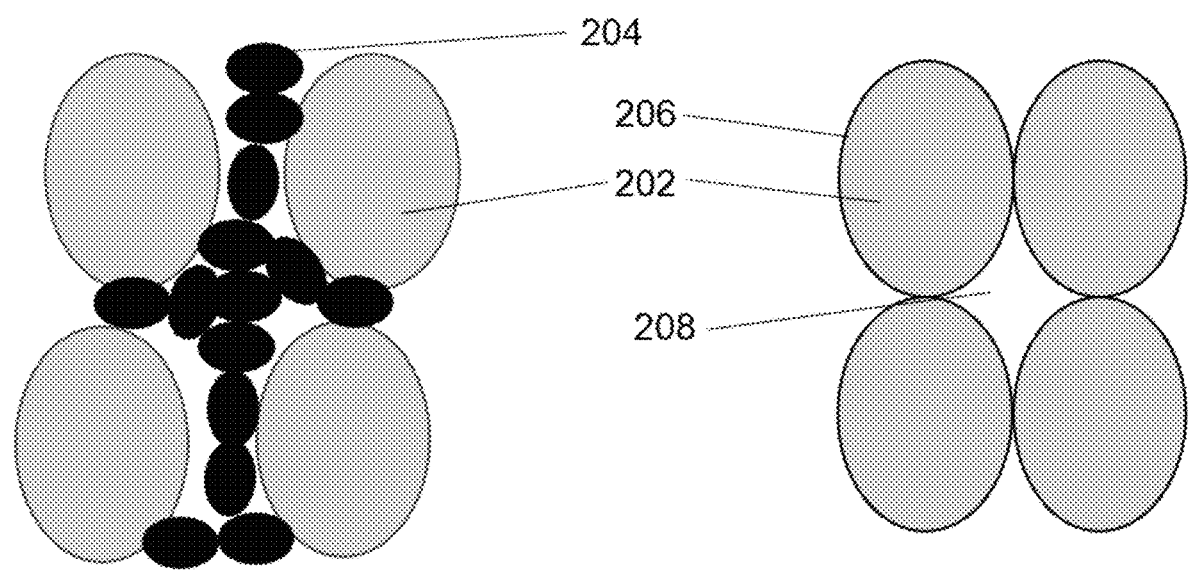
FIGS. 2A and 2B are illustrations showing a physical mixture of active material particles with carbon compared to active material particles coated with carbon, respectively.

The change in pores is demonstrated in the illustrations of FIGS. 2A and 2B. FIG. 2A shows a physical mixture of active material particles 202 and carbon 204, while FIG. 2B shows active material particles 202 coated with carbon 206. In the physical mixture, an excess of carbon 204 is required to create an electrical network. Mixing is critical; if the active material particles 202 and carbon 204 are not sufficiently mixed, it may prevent an electrical network from forming in parts of the electrode. Further, excess carbon 204 fills the pores of the electrode. However, for the active material particles 202 coated with carbon 206, minimal carbon is required to create an electrical network. Additionally, the pores 208 of the electrode remain open; this allows for better diffusion of the electrolyte throughout the electrode.

Processes such as carbon vapor deposition, particularly at low temperatures, ensure the carbon is deposited uniformly or substantially uniformly across the material. This is critical when using very low levels of carbon, to enable consistent conductivity throughout the material and ensuring improved utilization.

Example 1

Particles of EMD have a single-layer carbon coating deposited on them by any means known in the art. These carbon-coated EMD particles are incorporated into a cathode. The cathode exhibits greater conductivity than an otherwise identical cathode comprising uncoated EMD particles as the active material.

Example 2

An electrochemical cell is constructed comprising the cathode of Example 1. This electrochemical cell exhibits improved run-time compared to an otherwise identical electrochemical cell having a cathode with uncoated EMD particles.

Example 3

Particles of a binder have a single-layer carbon coating deposited on them by any means known in the art. These carbon-coated binder particles are incorporated into a cathode. The cathode exhibits greater conductivity than an otherwise identical cathode comprising uncoated binder particles.

Example 4

An electrochemical cell is constructed comprising the cathode of Example 3. This electrochemical cell exhibits improved run-time compared to an otherwise identical electrochemical cell having a cathode with uncoated binder particles.

Example 5

Particles of graphite have a single-layer carbon coating deposited on them by any means known in the art. These carbon-coated graphite particles are incorporated into a cathode. The cathode exhibits greater conductivity than an otherwise identical cathode comprising uncoated graphite particles.

Example 6

An electrochemical cell is constructed comprising the cathode of Example 5. This electrochemical cell exhibits improved run-time compared to an otherwise identical electrochemical cell having a cathode with uncoated graphite particles.

Example 7

Rings for a cathode are provided, and a single-layer carbon coating is deposited on one or more of them by any means known in the art. The rings are then assembled into a cathode, or inserted into a container so as to form a cathode. The cathode exhibits greater conductivity than an otherwise identical cathode comprising uncoated rings.

Example 8

An electrochemical cell is constructed comprising the cathode of Example 7. This electrochemical cell exhibits improved run-time compared to an otherwise identical electrochemical cell having a cathode with uncoated rings.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments. Further, the embodiments illustratively disclosed herein suitably may be practiced in the absence of any element which is not specifically disclosed herein.

What is claimed is:

1. An electrode for an electrochemical cell, said electrode comprising electrode components, said electrode components comprising i) an active material, wherein the active material is an oxide, ii) a binder, and iii) graphite, wherein at least one of the electrode components is in the form of particles comprising a carbon coating, wherein the carbon coating has a thickness of about 0.3 nm-0.8 nm.

2. The electrode of claim 1, wherein the active material is in the form of the particles comprising a carbon coating.

3. The electrode of claim 1, wherein the binder is in the form of the particles comprising a carbon coating.

4. The electrode of claim 1, wherein the graphite is in the form of the particles comprising a carbon coating.

5. The electrode of claim 1, wherein the active material comprises at least one of manganese dioxide, a nickelate, nickel oxyhydroxide, or copper oxide.

6. The electrode of claim 5, wherein the active material comprises at least one of electrolytic manganese dioxide (EMD), chemical manganese dioxide (CMD), or natural manganese dioxide (NMD).

7. The electrode of claim 1, wherein the graphite is expanded graphite.

8. The electrode of claim 1, wherein the binder comprises a material selected from the group consisting of polyvinylidene fluoride (PVDF), polyethylene, copolymers based on polystyrene and ethylene/propylene, polytetrafluoroethene (PTFE), poly(3,4-ethylenedioxythiophene) (PEDOT) copolymers, polystyrene sulfonate (PSS), and PEDOT:PSS polymer mixtures.

9. The electrode of claim 1, wherein the carbon coating is one layer of carbon thick.

10. The electrode of claim 1, wherein the electrode's conductivity is greater than that of an otherwise substantially identical electrode which does not comprise the carbon coating.

11. The electrode of claim 1, wherein the electrode is a cathode.

12. An alkaline electrochemical cell, comprising the electrode of claim 1.

13. The alkaline electrochemical cell of claim 12, comprising an anode having an active material selected from the group consisting of zinc, magnesium, aluminum and silicon.

14. An electrode for an electrochemical cell, wherein the electrode is a ring-molded electrode comprising a plurality of rings, and wherein at least one of the rings has a carbon coating.

15. A method of producing the electrode of claim 1, comprising
   i) mixing active material, binder, and graphite, wherein at least one of these is in the form of particles having a carbon coating, with electrolyte and, optionally, additives, so as to make an electrode mix; and
   ii) forming a plurality of rings from the electrode mix; and
   iii) inserting the rings into a container.

16. A method of producing the electrode of claim 1, comprising
   i) mixing active material, binder, and graphite, wherein at least one of these is in the form of particles having a carbon coating, with electrolyte and, optionally, additives, so as to make an electrode mix; and
   ii) using a ram to mold the electrode mix into a solid tubular configuration.

17. The method of claim 15, wherein the electrode is a cathode.

18. The method of claim 15, wherein the particles having a carbon coating are prepared by a method selected from the group consisting of chemical vapor deposition, carbon evaporation, laser ablation, and arc discharge.

* * * * *